United States Patent [19]

Robinson et al.

[11] Patent Number: 5,567,933
[45] Date of Patent: Oct. 22, 1996

[54] OPTICAL FIBER DETECTION SYSTEM WITH DISTURBANCE AND POSITIVE CUT-LOOP DETECTION CAPABILITIES

[75] Inventors: Jeffrey C. Robinson, Falkville; Brian B. Crawford, Madison, both of Ala.

[73] Assignee: Mason & Hanger National, Inc., Huntsville, Ala.

[21] Appl. No.: 388,459

[22] Filed: Feb. 14, 1995

[51] Int. Cl.$^6$ ................ G01J 1/04; G01B 9/10
[52] U.S. Cl. ................ 250/227.15; 356/73.10; 250/227.16; 250/227.27; 385/13
[58] Field of Search ............. 250/227.19, 227.27, 250/227.14, 227.15, 227.16, 231.19; 356/345, 73.1; 385/12, 13, 27; 340/555–557

[56] References Cited

U.S. PATENT DOCUMENTS

| | | |
|---|---|---|
| 4,375,680 | 3/1983 | Cahill et al. . |
| 4,773,758 | 9/1988 | Shaw . |
| 4,787,741 | 11/1988 | Udd et al. . |
| 4,853,534 | 8/1989 | Dakin . |
| 4,885,462 | 12/1989 | Dakin . |
| 4,896,141 | 1/1990 | Farquhar et al. ............ 250/227.14 |
| 4,898,468 | 2/1990 | Udd . |
| 4,904,050 | 2/1990 | Dunn et al. . |
| 4,931,771 | 6/1990 | Kahn . |
| 5,000,540 | 3/1991 | Nakamura ............ 250/227.14 |
| 5,012,088 | 4/1991 | Cole et al. . |
| 5,046,848 | 9/1991 | Udd ............ 250/227.19 |
| 5,158,449 | 10/1992 | Bryan et al. . |
| 5,208,455 | 5/1993 | Nelson et al. ............ 250/227.19 |
| 5,273,567 | 12/1993 | Richards . |
| 5,281,790 | 1/1994 | Nguyen et al. . |
| 5,319,176 | 6/1994 | Alvi et al. . |
| 5,355,208 | 10/1994 | Crawford et al. . |
| 5,370,067 | 12/1994 | Finet . |

FOREIGN PATENT DOCUMENTS

| | | |
|---|---|---|
| 91103509 | 3/1991 | European Pat. Off. . |
| 93/01870 | 3/1993 | WIPO . |

*Primary Examiner*—Stephone Allen
*Attorney, Agent, or Firm*—Dowell & Dowell

[57] ABSTRACT

The invention is an optical fiber detection system which includes a light source, a pair of optical couplers, an optical fiber loop and two photodetectors connected to the fiber loop. The optical couplers direct the light about the fiber loop such that one of the detectors detects the occurrence of disturbances in the fiber loop, and the other positively detects the occurrence of breaks.

19 Claims, 1 Drawing Sheet

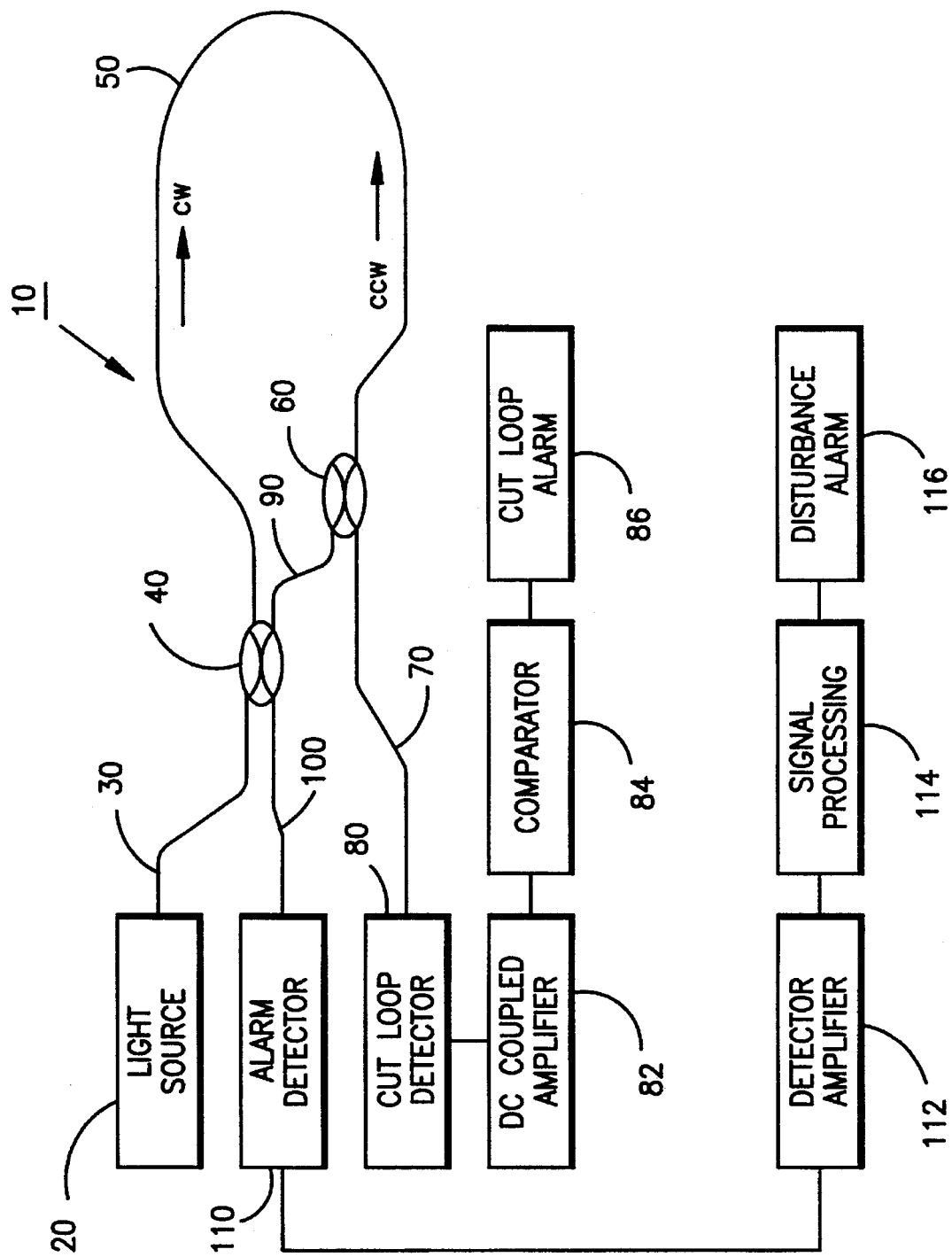

OPTICAL FIBER DETECTION SYSTEM WITH DISTURBANCE AND POSITIVE CUT-LOOP DETECTION CAPABILITIES

BACKGROUND OF THE INVENTION

1. Technical Field

The present invention relates to the field of fiber optics and, more particularly, to an optical fiber detection system which detects the occurrence of disturbances and breaks in an optical fiber loop.

2. Description of the Related Art

Distributed optical fiber sensing or detection systems have been developed which include low-loss optical fibers and solid state laser light sources. Such systems may be comprised of a single fiber sensing loop which extends kilometers in length.

Optical fiber sensing loops have been used in indoors and outdoors security applications. For example, sensing loops have been installed in floors and walls, and under carpets. Regarding outdoors applications, optical fiber sensing loops have been installed under surfaces traversed by people and vehicles, about the perimeter of secured areas to detect unauthorized entries, and in telecommunication and power cables to detect tampering with the cables.

The known optical fiber sensing systems have been mostly based on the Sagnac and Mach-Zehnder interferometers. Interferometers monitor phase differences between two optical signals, whose phases have been shifted by changes in the optical properties of their respective light paths. Optical fibers are sensitive to physical disturbances caused by pressure and temperature changes. Such disturbances affect the optical properties of the fiber light path. The changes in the optical properties of the fibers may be in the form of an elongation, a change in the index of refraction, birefringence, or a combination of these and other related optical effects.

U.S. Pat. No. 4,885,462 to Dakin discloses an optical fiber sensing system comprised of a Sagnac interferometer and a Mach-Zehnder interferometer. The primary objective of the system is to detect the occurrence and location of disturbances to the system.

Another optical fiber sensing system is disclosed in U.S. Pat. No. 5,355,208 to Crawford et al. The system comprises a Sagnac interferometer sensing loop and associated electronic components. The system detects the occurrence and location of remote disturbances.

A significant disadvantage of the known phase sensitive detection systems is their inability to reliably and accurately detect the occurrence of breaks in optical fiber loops. An interferometer may be used, for example, to activate an alarm if a zero or near zero DC level is measured in a fiber loop to indicate the occurrence of a break. The DC level of an interferometer may go to near zero due to natural fluctuations in the light signal, however, without the fiber loop actually being cut or broken. Thus, although interferometers are able to detect the occurrence of a break, they are also prone to give false readings of breaks when none have actually occurred.

A further disadvantage of the known phase sensitive detection systems is that an ON/OFF-type detection system cannot be implemented in the systems, to detect the occurrence of breaks in the sensing loop, without introducing operational problems into the modified system. More particularly, ON/OFF type detection systems detect changes in the intensity of the light signal, from an ON level to an OFF level, due to a break occurring in the sensing loop. The ON/OFF-type detection systems do not detect phase differences between light signals.

An attempt to implement an ON/OFF detection system in an interferometer may cause the interferometer to trigger an alarm even without the occurrence of a break in the loop, due to the phase-bias effect in the system.

Therefore, there has been a need for an optical fiber detection system which is capable of positively detecting the occurrence of disturbances and breaks in a sensing loop, and is not adversely affected by optical phenomena within the sensing loop.

SUMMARY OF THE INVENTION

The present invention has been made in view of the above-described inadequacies of the known fiber optic sensing systems and has as an object to provide an optical fiber detection system which is capable of positively detecting the occurrence of disturbances and breaks in a sensing loop without being affected by optical phenomena.

Another object of the present invention is to provide an optical fiber detection system which can be used in a Sagnac interferometer to provide a detection system capable of positively detecting breaks in the sensing loop.

To achieve the foregoing objects and advantages of the invention, as embodied and broadly described herein, the optical fiber detection system in accordance with a preferred embodiment of the invention comprises a light source for emitting a light beam. A first optical coupler is connected to the light source and a second optical coupler is connected to the first optical coupler. An optical fiber sensing loop has one end connected to the first optical coupler and another end connected to the second optical coupler.

The detection system further comprises a first photodetector connected to the first optical coupler to detect the occurrence of disturbances in the optical fiber sensing loop, and a second photodetector connected to the second optical coupler to positively detect the occurrence of a break in the optical fiber sensing loop.

BRIEF DESCRIPTION OF THE DRAWING

In the accompanying drawing:

The drawing FIGURE is a schematic diagram of an optical fiber detection system in accordance with a preferred embodiment of the invention.

DETAILED DESCRIPTION OF THE PREFERRED EMBODIMENT

The drawing FIGURE illustrates an optical fiber detection system 10 in accordance with a preferred embodiment of the invention. The system provides absolute detection capabilities for breaks or cuts in an optical fiber sensing loop. Such breaks may occur, for example, due to natural events or tampering by individuals attempting to enter secured areas enclosed by the sensing loop.

The detection system 10 comprises a means 20 for emitting a beam of light. The light emission means is preferably a laser, and may optionally be an LED or the like.

The light signal emitted by the light source 20 is transmitted through an optical fiber 30 to a 2×2 directional optical coupler 40 which separates the light signal into two light signals, CW and CCW, which propagate in opposite directions about an optical fiber sensing loop 50.

The signal CW travels in the clockwise direction. A directional optical coupler 60 is provided in the sensing loop 50 to direct the signal CW to a photodetector 80 via an optical fiber 70. The optical coupler 60 is preferably a 2×2 coupler, and may optionally be a 1×2 coupler. The photodetector 80 is referred to herein as the cut loop photodetector.

The cut loop photodetector 80 measures the optical power of the signal CW only, as none of the optical power of the signal CCW is incident upon this photodetector. In operation, the intensity of the light signal incident upon the cut loop photodetector is constant so long as the sensing loop 50 is intact and the light source is functioning properly. A DC-coupled cut loop photodetector amplifier 82 is electrically connected to the cut loop photodetector. The amplifier receives an output signal from the cut loop photodetector and provides a constant level DC voltage, representative of the optical power of the signal CW incident on the cut loop photodetector 80, to a comparator 84. The comparator compares the DC voltage value to a reference ("ON") voltage, which is set at a desired value. If the comparator determines that the DC voltage is below the reference voltage, the DC voltage is considered to be "OFF". The comparator then signals an associated cut loop alarm 86 to activate an alarm to indicate that the intensity of the signal CW is below a reference intensity and, therefore, either the sensing loop 50 is cut or broken, or the light source 20 is defective.

An important advantage of the detection system 10 in accordance with the invention is that the power of the signal CW cannot change either due to phase bias or polarization changes. Consequently, the detection system overcomes the problem of false readings of cut loop events, which limits the effectiveness of the known detection systems, and is capable of detecting the occurrence of breaks in the fiber loop 50 with absolute accuracy.

During normal operation of the detection system, when the sensing loop 50 is intact and the light source is functioning properly, the optical coupler 60 divides the signal CW into two beams. One beam is directed to the cut loop detector 80, and the other beam to a photodetector 110, herein referred to as the alarm photodetector 110, via the optical fiber 90, the first coupler 40, and the optical fiber 100.

The signal CCW is directed by the optical coupler 40 to the optical coupler 60 via the optical fiber 90. The optical coupler 60 directs one-half of the signal CCW into an unused port of the coupler 60, and the other one-half around the sensing loop 50 in the counter-clockwise direction, such that the signal CCW bypasses the fiber 70 and the cut loop photodetector 80. After propagating about the sensing loop, the signal CCW arrives back at the optical coupler 40, and is directed via the fiber 100 to the alarm photodetector 110. Accordingly, the signals CW and CCW both enter the alarm photodetector, while only signal CW enters the cut loop photodetector 80.

A function of the detection system 10 is that of a Sagnac interferometer to detect the occurrence of disturbances in the sensing loop 50. The alarm photodetector 110 measures the relative level of interference of the output of the signals CW and CCW. In a stable condition of the detection system, the degree of interference between the two signals is steady and the alarm photodetector produces a steady DC output to a connected alarm photodetector amplifier 112. The output may be zero or greater depending on whether the two signals interfere in a constructive or destructive manner.

Any disturbances made to the sensing loop 50 within the common path of the signals CW and CCW cause the optical properties of the sensing loop to change locally. Consequently, the phase relationship of the two signals is changed in the disturbed region, and the resultant relative interference level is changed also. The steady output of the alarm photodetector 110 to the amplifier 112 is altered in direct proportion to the degree of disturbance. When the relative interference level is such that the output exceeds a set threshold level, a signal processor 114 signals a disturbance alarm 116 to activate an alarm which indicates that a disturbance has occurred in the sensing loop.

Although the portion of the detection system 10 which functions as a Sagnac interferometer positively detects the occurrence of disturbances, it is unable to positively detect the occurrence of breaks in the sensing loop 50. As explained above, the DC level of the alarm photodetector 110 may drop to near zero and activate an alarm without the fiber loop 50 actually being cut or broken. By incorporating the optical coupler 60 and the cut loop photodetector 80, this problem of the known detection systems is overcome.

In the detection system 10, if a disturbance is so severe that it breaks the fiber loop 50, the light signal to the alarm photodetector 110 is terminated. The cut loop alarm 86 is activated to positively signify that the fiber loop 50 is broken. The alarm emitted by the cut loop alarm 86 may be silent or audible. In the later case, the alarm signal is preferably distinct in sound from the alarm signal emitted by the disturbance alarm 116 due to a detected disturbance in the fiber loop 50.

Therefore, in contrast to the known interferometer based detection systems, the detection system in accordance with the invention is unaffected by optical changes in phase bias or polarization, except with respect to the interference level in the system. There are no interference pattern and phase-induced intensity variation problems in the system, and the system positively detects and differentiates between the occurrence of disturbances and breaks in the sensing loop.

The detection system 10 is not intended to be able to determine the exact location of any break in the sensing loop 50. Accordingly, the system does not require additional complex and expensive components such as a processor to achieve this purpose.

The detection system 10 is also unable to detect the occurrence of breaks in the fiber 90 or the fiber 100, because the signal CW is directed to the cut loop photodetector 80 before being directed to these fibers. To avoid having exposed regions of the sensing loop that cannot detect a break, the fibers 90 and 100 are preferably located within a module or a like enclosure.

It will be understood that the optical coupler 60, the fiber 70 and the cut loop photodetector 80 may be separately provided to be incorporated in a conventional Sagnac interferometer system, to achieve a detection system further capable of positive cut loop detection. The optical coupler 60 can be readily incorporated into a fiber sensing loop by splicing, and the optical fiber 70 and the cut loop photodetector 80 connected to the coupler 60. In addition, the alarms 86 and 116 and associated electronic components may also be incorporated into the modified Sagnac system.

The foregoing description of the preferred embodiment of the invention has been presented to illustrate the principles of the invention and not to limit the invention to the particular embodiment illustrated. It is intended that the scope of the invention be defined by all of the embodiments encompassed by the following claims, and their equivalents.

What is claimed is:

1. An optical fiber detection system, comprising:

a light source;

a first optical coupler connected to said light source;

a second optical coupler connected to said first optical coupler;

an optical fiber sensing loop having opposite ends connected to said first optical coupler and said second optical coupler, respectively;

a first photodetector connected to said first optical coupler, said first photodetector detects the occurrence of a disturbance in said optical fiber sensing loop; and a second photodetector connected to said second optical coupler, said second photodetector positively detects the occurrence of a break in said optical fiber sensing loop.

2. The optical fiber detection system of claim 1, wherein said light source is connected to said first optical coupler by a first optical fiber, said second optical coupler is connected to said second photodetector by a second optical fiber, said second optical coupler is connected to said first optical coupler by a third optical fiber, and said first optical coupler is connected to said first photodetector by a fourth optical fiber.

3. The optical fiber detection system of claim 2, wherein said third and fourth optical fibers are contained within an enclosure.

4. The optical fiber detection system of claim 1, wherein said first optical coupler separates light emitted by said light source into a first light signal and a second light signal, and said first and second light signals propagate in opposite directions about said optical fiber sensing loop.

5. The optical fiber detection system of claim 4, wherein said second optical coupler divides said first light signal into a first beam and a second beam, said first beam being directed to said first photodetector and said second beam being directed to said second photodetector.

6. The optical fiber detection system of claim 5, further comprising a first alarm electrically connected to said first photodetector, said first alarm being activated when an output signal of said first photodetector exceeds a threshold level so as to indicate the occurrence of a disturbance in said optical fiber sensing loop.

7. The optical fiber detection system of claim 6, wherein said first beam and second light signal are incident upon said first photodetector, and said first photodetector measures the relative interference level of said first beam and said second light signal.

8. The optical fiber detection system of claim 7, further comprising a second alarm electrically connected to said second photodetector, said second alarm being activated when said second photodetector detects the occurrence of a break in said optical fiber sensing loop.

9. The optical fiber detection system of claim 8, wherein said second photodetector measures the intensity of said second beam, and said second alarm is activated when the measured intensity of said second beam is less than a reference intensity.

10. A detection system for use in a Sagnac optical fiber sensing system which comprises a light source, a first optical coupler, an optical fiber sensing loop having first and second opposite ends, the first opposite end being connected to the first optical coupler, the first optical coupler separates light emitted by the light source into a first light signal and a second light signal, which signals propagate in opposite directions about the optical fiber loop, and a first photodetector which detects the occurrence of disturbances in the optical fiber sensing loop, the detection system comprising:

a second optical coupler for connecting to the second opposite end of the optical fiber sensing loop; and a second photodetector connected to said second optical coupler, said second photodetector positively detects the occurrence of a break in said optical fiber sensing loop.

11. The detection system of claim 10, wherein said second optical coupler divides said first light signal into a first beam and a second beam, said first beam being directed to said first photodetector and said second beam being directed to said second photodetector.

12. The detection system of claim 11, further comprising a first alarm electrically connected to said first photodetector, said first alarm being activated when an output signal of said first photodetector exceeds a threshold level so as to indicate the occurrence of a disturbance in said optical fiber sensing loop.

13. The detection system of claim 12, wherein said first beam and said second light signal are incident upon said first photodetector, and said first photodetector measures the relative interference level of said first beam and said second light signal.

14. The detection system of claim 13, further comprising a second alarm electrically connected to said second photodetector, said second alarm being activated when said second photodetector detects the occurrence of a break in said optical fiber sensing loop.

15. The detection system of claim 14, wherein said second photodetector measures the intensity of said second beam, and said second alarm is activated when the measured intensity of said second beam is less than a reference intensity.

16. An optical fiber detection system, comprising:

a light source;

an optical fiber sensing loop;

means for separating light emitted by said light source into first and second light signals which propagate in opposite directions about said optical fiber sensing loop; and photodetector means connected to said optical fiber sensing loop for detecting, and positively differentiating between, the occurrence of a disturbance and a break in said optical fiber sensing loop.

17. The optical fiber detection system of claim 16, wherein said photodetector means comprises a first photodetector which detects the occurrence of a disturbance in said optical fiber sensing loop, and a second photodetector which positively detects the occurrence of a break in said optical fiber sensing loop.

18. The optical fiber detection system of claim 17, further comprising means for dividing said first light signal into a first beam and a second beam, said first beam and said second light signal being directed to said first photodetector, and said second beam being directed to said second photodetector.

19. The optical fiber detection system of claim 18, further comprising a first alarm electrically connected to said first photodetector and a second alarm electrically connected to said second photodetector, said first alarm being activated when an output signal of said first photodetector exceeds a threshold level so as to indicate the occurrence of a disturbance in said optical fiber sensing loop, said second photodetector measures the intensity of said second beam and said second alarm is activated when the measured intensity of said second beam is less than a reference intensity so as to indicate the occurrence of a break in said optical fiber sensing loop.

* * * * *